(12) United States Patent
Murakami (10) Patent No.: US 7,344,187 B2
(45) Date of Patent: Mar. 18, 2008

(54) STRUCTURE FOR INSTALLING PROTECTION MEMBER AND WORKING MACHINE INCLUDING THE SAME

(75) Inventor: Masaaki Murakami, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 0 days.

(21) Appl. No.: 11/533,602

(22) Filed: Sep. 20, 2006

(65) Prior Publication Data

US 2007/0085379 A1    Apr. 19, 2007

(30) Foreign Application Priority Data

Oct. 14, 2005    (JP)    ............... 2005-299742

(51) Int. Cl.
*B60J 7/00*    (2006.01)

(52) U.S. Cl. .................... 296/190.03; 296/190.08; 180/89.12

(58) Field of Classification Search .......... 296/190.03, 296/190.08, 205, 187.09; 180/89.12; 244/118.5
See application file for complete search history.

(56) References Cited

U.S. PATENT DOCUMENTS

| | | | | |
|---|---|---|---|---|
| 3,972,378 | A * | 8/1976 | Houriez et al. ........... | 180/89.12 |
| 6,155,632 | A * | 12/2000 | Fujimoto ................ | 296/190.08 |
| 6,340,201 | B1 * | 1/2002 | Higuchi ................. | 296/190.04 |
| 6,394,212 | B1 * | 5/2002 | Takano et al. ........... | 180/89.13 |
| 6,450,284 | B1 * | 9/2002 | Sakyo et al. ............ | 180/89.12 |
| 6,568,746 | B2 * | 5/2003 | Sakyo et al. ........... | 296/190.08 |
| 6,769,732 | B2 * | 8/2004 | Sakyo ................... | 296/190.03 |
| 6,962,474 | B2 * | 11/2005 | Neunteufel et al. ........ | 414/685 |
| 7,258,393 | B2 * | 8/2007 | Lindqvist et al. ...... | 296/190.03 |
| 7,269,490 | B2 * | 9/2007 | Matsuda ................ | 701/50 |
| 2005/0000121 | A1 * | 1/2005 | Mori ..................... | 37/347 |
| 2006/0158006 | A1 * | 7/2006 | Mori .................... | 296/190.03 |
| 2006/0249986 | A1 * | 11/2006 | Yoon ..................... | 296/190.03 |
| 2007/0018484 | A1 * | 1/2007 | Lee ...................... | 296/190.08 |
| 2007/0035160 | A1 * | 2/2007 | Murakami ............. | 296/190.03 |
| 2007/0085380 | A1 * | 4/2007 | Murakami et al. ..... | 296/190.08 |

FOREIGN PATENT DOCUMENTS

| | | |
|---|---|---|
| JP | 5-42352 | 6/1993 |
| JP | 8-142785 | 6/1996 |
| JP | 8-184075 | 7/1996 |
| JP | 8-218436 | 8/1996 |
| JP | 2001-173017 | 6/2001 |
| JP | 2003-232053 | 8/2003 |
| JP | 2005-350948 | 12/2005 |
| WO | WO 2005/044642 A1 | 5/2005 |

* cited by examiner

*Primary Examiner*—Kiran B. Patel
(74) *Attorney, Agent, or Firm*—Oblon, Spivak, McClelland, Maier & Neustadt, P.C.

(57) ABSTRACT

There are provided: front supports provided vertically in front of a cabin on a rotating frame; a plurality of rear supports provided vertically and laterally with respect to each other behind the cabin on the rotating frame; a lateral frame for connecting the upper end portions of the rear supports; and an upper frame provided above the cabin to connect the lateral frame and the front supports at a position shifted leftward from a predetermined area where an attachment is raised and lowered, where one rear support is arranged behind a hoisting axis between vertical plates, while the other rear supports are arranged in rear of the cabin, and the lateral frame is arranged laterally across the vertical plates.

7 Claims, 8 Drawing Sheets

FRONT ⟵⟶ REAR

STRUCTURE FOR INSTALLING PROTECTION MEMBER AND WORKING MACHINE INCLUDING THE SAME

The present application claims priority under 35 U.S.C. § 119, from Japanese application 2005-299742, filed on Oct. 14, 2005.

BACKGROUND OF THE INVENTION

1. Field of the Invention

The present invention relates to a structure for installing a protection member for protecting a cabin and to a working machine such as a hydraulic excavator including the same.

2. Description of the Related Art

For example, there has been known a protection member adapted to surround a cabin with a rim-like frame to prevent direct contact with the ground when the working machine has a fall.

This kind of protection member includes four supports provided vertically on a placing frame on which the cabin is to be mounted and an upper frame for connecting the supports above the cabin, each two pairs of supports being provided vertically in front or rear of the cabin.

It is here necessary to increase the cross-sectional area of each support to improve the strength of the protection member, but driving devices including an engine are arranged in rear of the cabin, which makes it difficult to ensure a space for erecting the supports with an increased cross-sectional area on the placing frame.

Hence, as disclosed in Japanese Patent Laid-Open Publication No. Hei 8-142785 for example, there has also been known a protection instrument (protection member) in which rear leg portions (supports) are erected on pedestal plates protruding perpendicularly from sidewalls that are erected on a placing frame so that the rear leg portions are held above the frame.

In this protection member, even in the case where there is only a limited space on the placing frame, it is possible to install the supports with avoiding driving devices by forming the pedestal plates above the driving devices and fixing the supports onto the pedestal plates, but the supports are fixed to the placing frame via the pedestal plates, which makes it impossible to ensure sufficient strength of the protection member.

That is, even in the case where the cross-sectional area of the protection member is increased to improve the strength of the supports themselves, side plates disposed between the pedestal plates for supporting the supports and the placing frame are likely to be distorted and deformed, which makes it impossible to ensure sufficient strength of the entire protection member.

SUMMARY OF THE INVENTION

It is an object of the present invention to provide a structure for installing a protection member whereby it is possible to ensure sufficient strength even in the case where there is only a limited space in rear of a cabin on a placing frame and a working machine including the same.

First, a structure for installing a protection member according to the present invention has the following basic arrangement.

That is, the structure for installing the protection member according to the present invention includes a placing frame with a cabin of a working machine mounted thereon. The protection member is provided on the placing frame and surrounds the cabin from front and back as well as from above to protect the cabin. Then, the installation structure includes an attachment of the working machine adapted to be attached to the placing frame, on the placing frame being set an attachment area for attaching the attachment therein laterally with respect to the cabin. Further, a pair of left and right vertical plates to be provided in the attachment area and adapted to hold the both end portions of a lateral axis for supporting the attachment hoistably are provided vertically in an extended manner in the anteroposterior direction. Here, the protection member includes: front supports provided vertically in front of the cabin on the placing frame; a plurality of rear supports provided vertically and laterally with respect to each other behind the cabin on the placing frame; a lateral frame for connecting the upper end portions of the rear supports; and an upper frame provided above the cabin to connect the lateral frame and the front supports at a position shifted laterally from the area where the attachment is raised and lowered, wherein the rear supports include one arranged behind the lateral axis between the vertical plates and one arranged in rear of the cabin, the lateral frame being arranged laterally across the vertical plates.

In accordance with the present invention, the rear supports can be provided vertically so as to support the upper frame with sufficient strength by making effective use of a space between the left and right vertical plates in the attachment area for attaching the attachment therein. In addition, since the upper frame is provided at a position shifted from the area where the attachment is raised and lowered and is connected to the lateral frame for connecting the upper end portions of the rear supports, the rear supports having advantages in strength can be provided vertically while avoiding interference between the attachment and the protection member.

That is, since a space for allowing raising and lowering movements of the attachment is ensured within the attachment area, the protection member can have sufficient strength by providing a rear support with an increased cross-sectional area vertically in the space within the attachment area, even in the case where there is only a limited space in rear of the cabin.

Also in the present invention, the rear support provided within the attachment area is preferably fixed directly to the placing frame, unlike the conventional structure in which rear supports are provided via pedestal plates that protrude perpendicularly from vertical plates. This prevents the vertical plates from being, for example, distorted and deformed to allow sufficient strength to be ensured.

In the case above, it is possible to ensure sufficient strength of the protection member even in the case where there is only a limited space in rear of the cabin.

The number of rear supports is not particularly restricted, but a plurality of rear supports are preferably arranged in rear of the cabin.

In the case above, since three or more rear supports provided in rear of the cabin and in the attachment area are used to install the protection member on the placing frame, it is possible to maintain the strength of the protection member while reducing the cross-sectional area of each rear support smaller than the case where two rear supports are used to install the protection member.

Therefore, since it is possible to fix the plurality of rear supports in the limited space in rear of the cabin by reducing the cross-sectional area of the rear supports to be provided in rear of the cabin, and further since it is possible to maintain the strength of the entire protection member with these rear supports and the rear support to be provided in the attachment area, it is possible to ensure great strength even in the case where there is only a limited space in rear of the cabin.

The lateral frame may be disposed higher than the upper surface of the cabin, where the raising and lowering range of the attachment may be limited to avoid interference between the lateral frame and the attachment. On the contrary, in accordance with the arrangement in which the height of the rear supports is set so that the lateral frame is arranged lower than the upper surface of the cabin and the upper frame includes a cover part extending rearward above the cabin and a flexion part extending downward from the rear end portion of the cover part to be fixed onto the lateral frame, setting the height of the lateral frame to be arranged above the attachment area lower than the upper surface of the cabin allows the raising and lowering range of the attachment to be further widened rearward, and arranging the upper frame to have the cover part above the cabin and the flexion part for connecting the cover part and the lateral frame allows the cabin to be protected from front and back as well as from above.

It is particularly preferable that the attachment can be attached to the placing frame hoistably between a lowered posture where the attachment is lowered forward and a raised posture where the attachment is raised rearward about the lateral axis, and that the height of the rear supports be set so that the rear supports and the lateral frame are not in contact with the attachment in the raised posture.

In the case above, it is possible to prevent interference between raising and lowering movements of the attachment and the lateral frame reliably.

Then, the protection member may be fixed to the placing frame, but it is preferable that the upper frame and the lateral frame as well as the front supports and the placing frame be attachable and detachable to/from each other.

In the case above, when the upper frame is detached from the lateral frame, the front supports and the upper frame can be detached easily from the placing frame with the rear supports being fixed to the placing frame.

Also, it is particularly preferable that the rear supports penetrate vertically through an outer covering for covering the placing frame, the upper frame and the lateral frame being attachable and detachable to/from each other outside the outer covering.

In the case above, since the upper frame can be detached outside the outer covering, the detaching of the protection member can be carried out consistently outside the outer covering by detaching the upper frame and the front supports from the placing frame.

It is further preferable that a counterweight be secured behind the cabin on the placing frame and a bottomed fitting hole opened upward be formed in the counterweight, and that each rear support to be provided in rear of the cabin is inserted into the fitting hole to be fixed onto the placing frame.

In the case above, since each rear support can be fixed to the counterweight that is secured on the placing frame, it is possible to fix the rear supports onto the placing frame without requiring extra fixing members such as bolts.

Next, the working machine according to the present invention includes: the above-described structure for installing the protection member; a lower traveling body with the placing frame mounted rotatably thereon; and an attachment provided hoistably on the placing frame.

In the case above, the protection member can protect the cabin reliably even in the case, for example, where the working machine has a fall during an operation on a shaky ground.

BRIEF DESCRIPTION OF THE DRAWINGS

FIGS. 7A and 7B show a hydraulic excavator according to a second embodiment of the present invention, where FIG. 7A is a partially simplified back view and FIG. 7B is a partially simplified plan view of FIG. 7A; and FIGS. 8A and 8B show a hydraulic excavator according to a third embodiment of the present invention, where FIG. 8A is a partially simplified back view and FIG. 8B is a cross-sectional view along the line IXb-IXb in FIG. 8A.

DESCRIPTION OF THE PREFERRED EMBODIMENTS

Preferred embodiments of the present invention will hereinafter be described with reference to the accompanying drawings.

Figure 1:
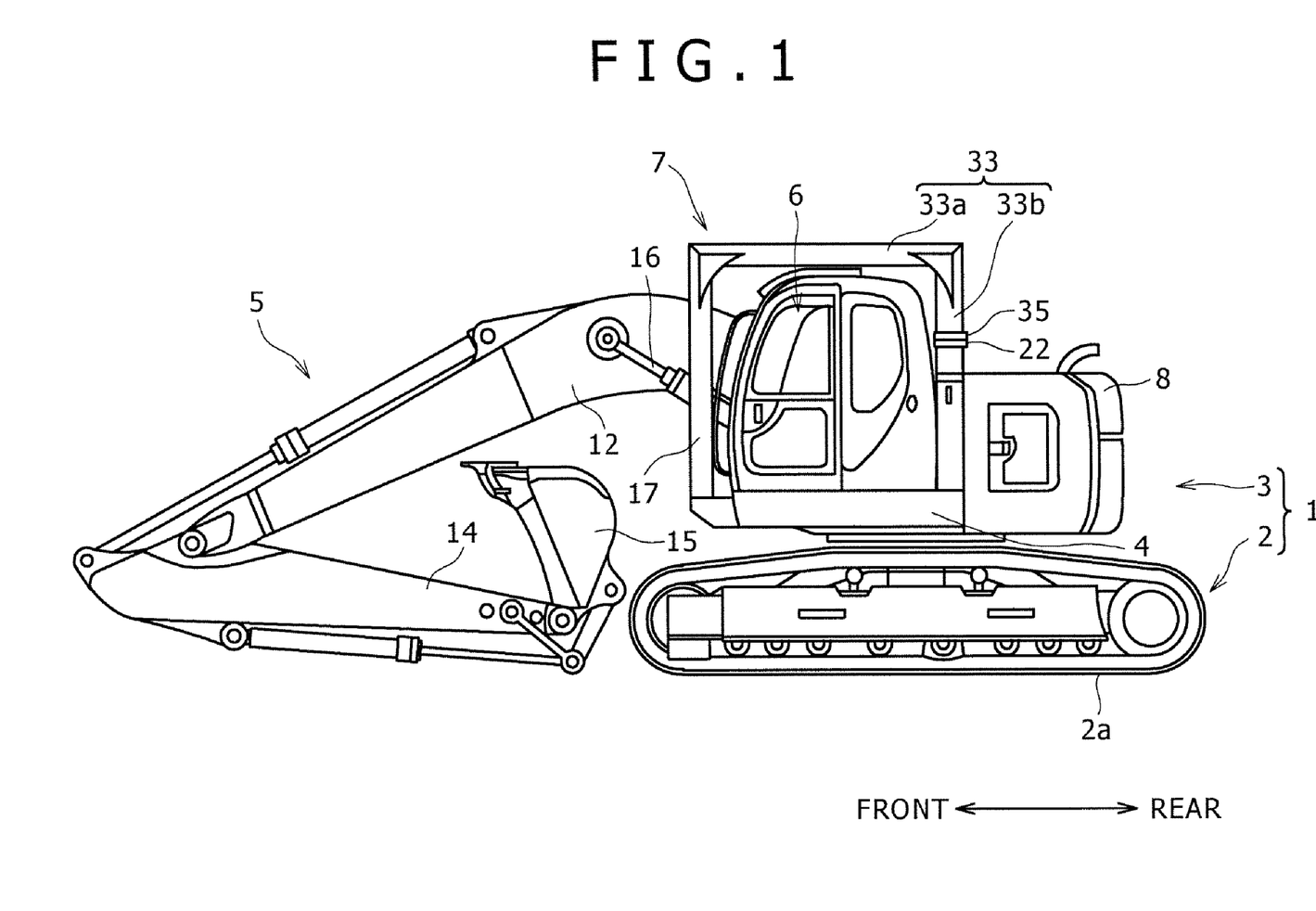
FIG. 1 is a side view showing the overall configuration of a hydraulic excavator according to a first embodiment of the present invention.
Figure 2:
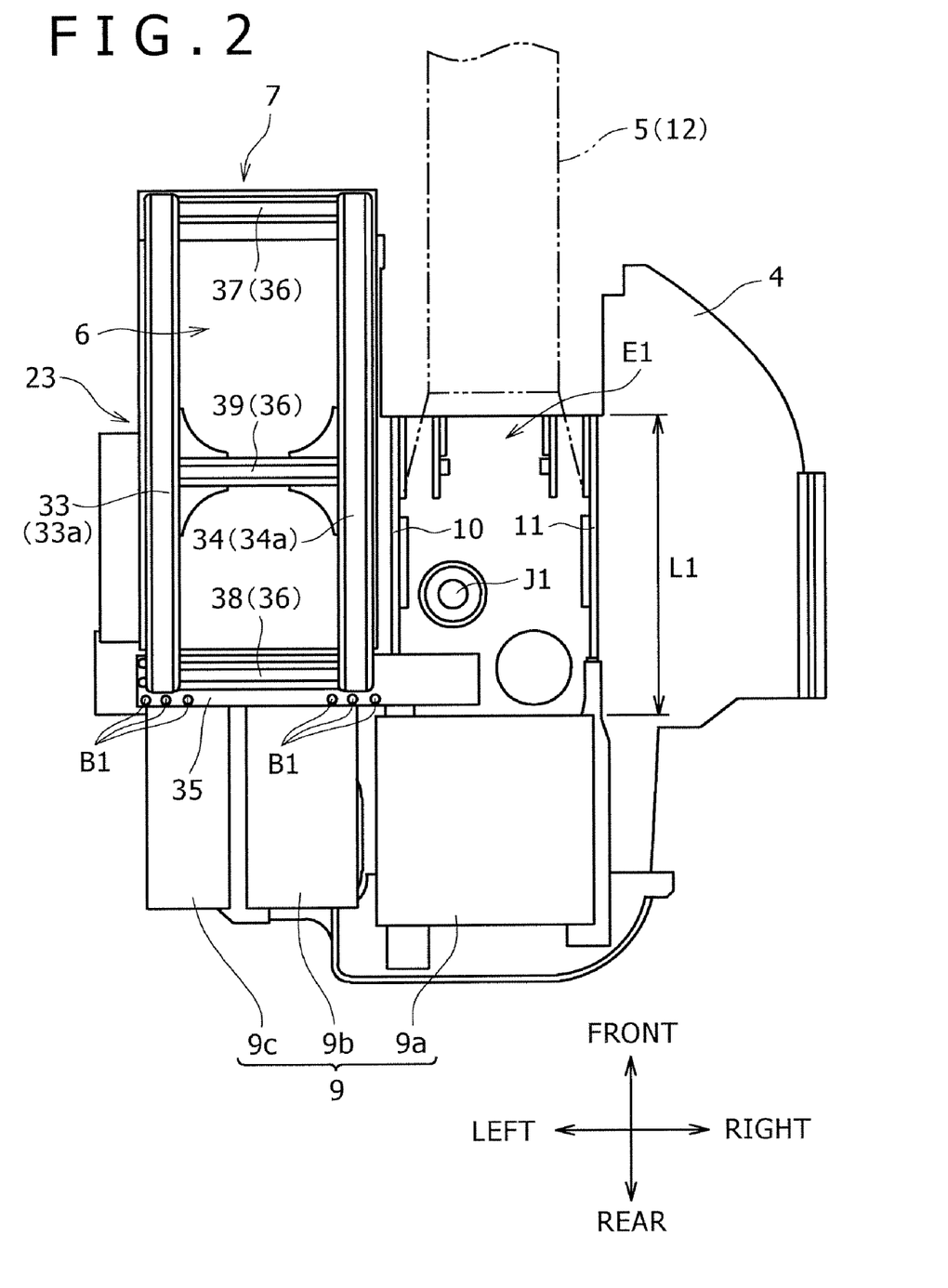
FIG. 2 is a partially simplified plan view showing the rotating frame of the upper rotating body shown in FIG. 1.
Figure 3:
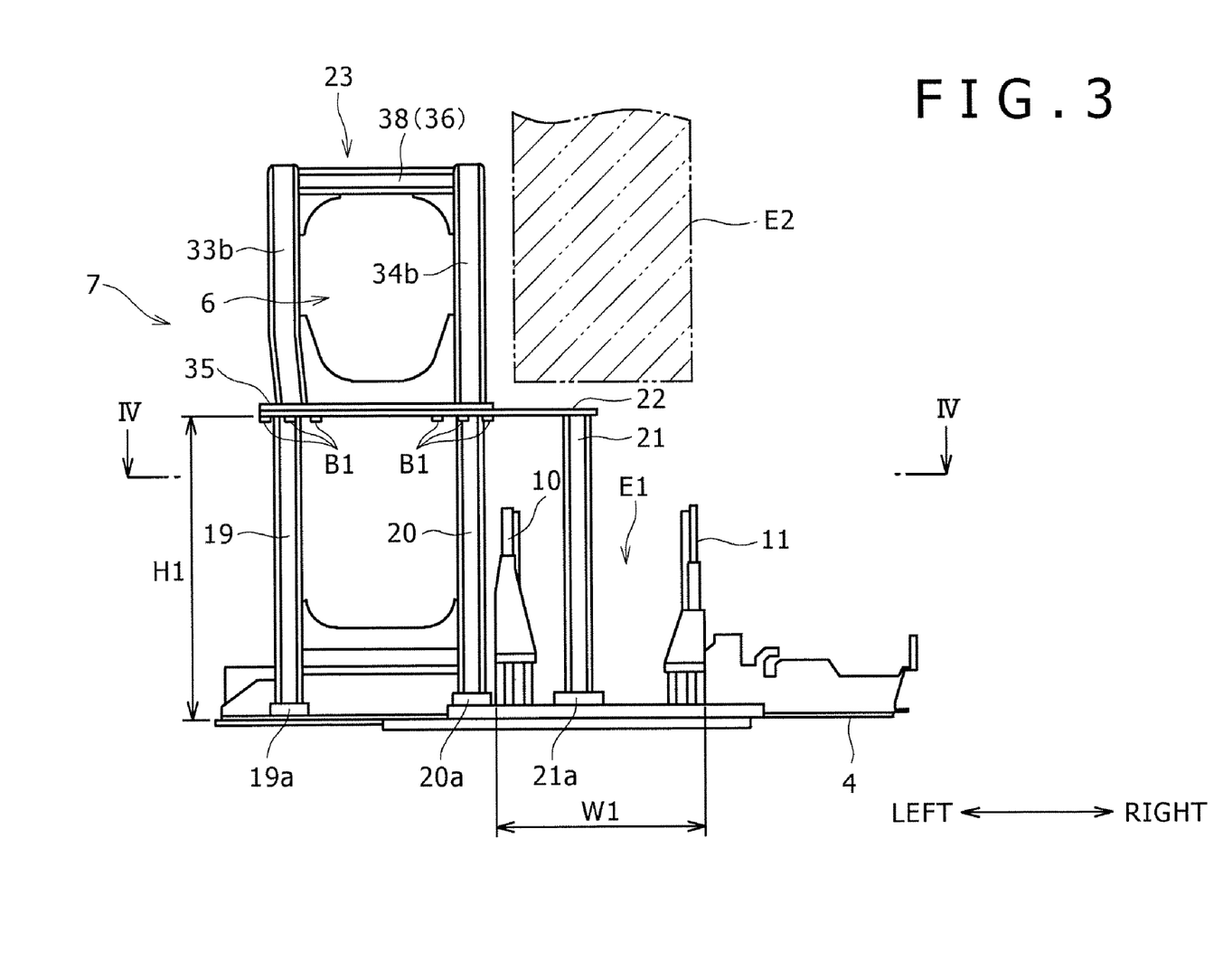
FIG. 3 is a partially simplified back view of the upper rotating body shown in FIG. 2.
Figure 4:
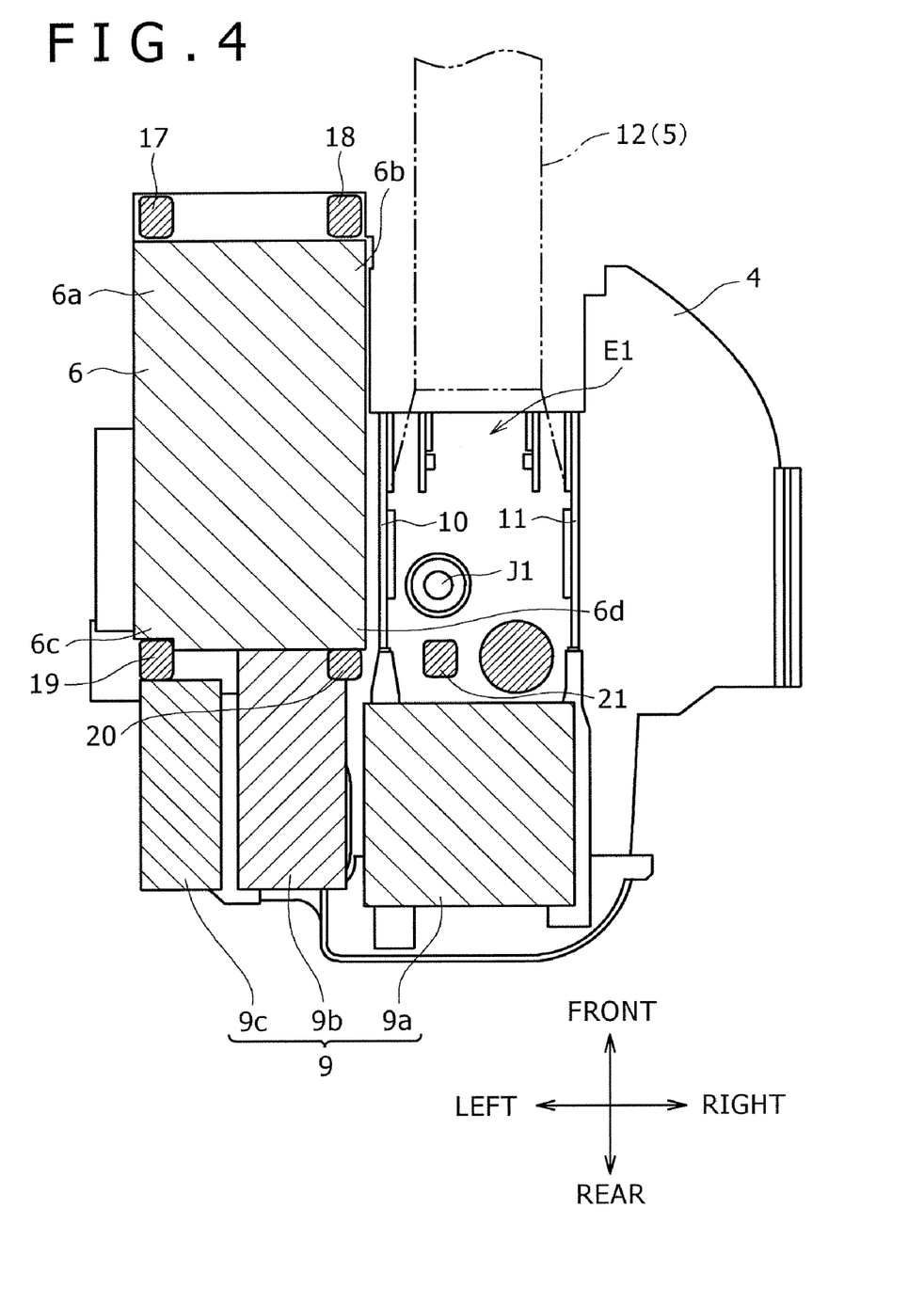
FIG. 4 is a cross-sectional view along the line IV-IV in FIG. 3.

FIG. 1 is a side view showing the overall configuration of a hydraulic excavator according to a first embodiment of the present invention; FIG. 2 is a partially simplified plan view showing the rotating frame of the upper rotating body shown in FIG. 1; FIG. 3 is a partially simplified back view of the upper rotating body shown in FIG. 2; and FIG. 4 is a cross-sectional view along the line IV-IV in FIG. 3.

Referring now to these figures, the hydraulic excavator 1 as an example of a working machine includes a lower traveling body 2 provided with a crawler 2a and an upper rotating body 3 mounted on the lower traveling body 2.

The upper rotating body 3 includes a rotating frame (placing frame) 4 attached around a vertically extending rotating axis J1 rotatably with respect to the lower traveling body 2. In the front part of the rotating frame 4, an attachment area E1 (indicated by the width W1 and the length L1) for attaching an attachment 5 therein is set in approximately the center in the width direction, and a cabin 6 is provided adjacent to the attachment area E1. It is noted that the direction in which the cabin 6 and the attachment area E1 are adjacent to each other is defined as lateral direction in the following descriptions.

Specifically, the upper rotating body 3 includes: the rotating frame 4; the attachment 5; the cabin 6; a protection member 7 for surrounding the cabin 6 from front and back as well as from above; an outer covering 8 for covering the rotating frame 4 at portions other than the cabin 6 and the attachment area E1; and driving devices 9 housed in the outer covering 8 and arranged behind the cabin 6.

On the rotating frame 4, there are formed a pair of left and light vertical plates 10 and 11 extending in the anteroposterior direction along the left and right edge portions of the attachment area E1. A laterally extending hoisting axis (lateral axis) J2 (refer to FIG. 5) is provided across the vertical plates 10 and 11, the hoisting axis J2 supporting the attachment 5 hoistably with respect to the rotating frame 4.

Specifically, the attachment 5 is composed of a boom 12 and an arm 14 connected to the leading end portion of the boom 12, and a bucket 15 is attached swingably to the leading end portion of the arm 14. The boom 12 is adapted to be raised and lowered between a lowered posture P1 and a raised posture P2 shown in FIG. 5 about the hoisting axis J2 with expansion and contraction of a boom cylinder 16.

Referring again to FIGS. 1 to 4, the cabin 6 has an approximately rectangular box shape with the longitudinal and width directions thereof corresponding, respectively, to the anteroposterior and lateral directions, and an operator gets on and off from the left side.

The protection member 7 includes: a pair of left and right front supports 17 and 18 arranged in front of the cabin 6; three rear supports 19, 20, and 21 arranged laterally with respect to each other behind the cabin 6; a lateral frame 22 for connecting the upper end portions of the rear supports 19 to 21; and an upper frame 23 for connecting the lateral frame 22 and the front supports 17 and 18.

The front supports 17 and 18 are provided vertically in front of the respective front corner portions 6a and 6b of the cabin 6 on the rotating frame 4. The front supports 17 and 18 are attached detachably to the rotating frame 4.

Figure 5:
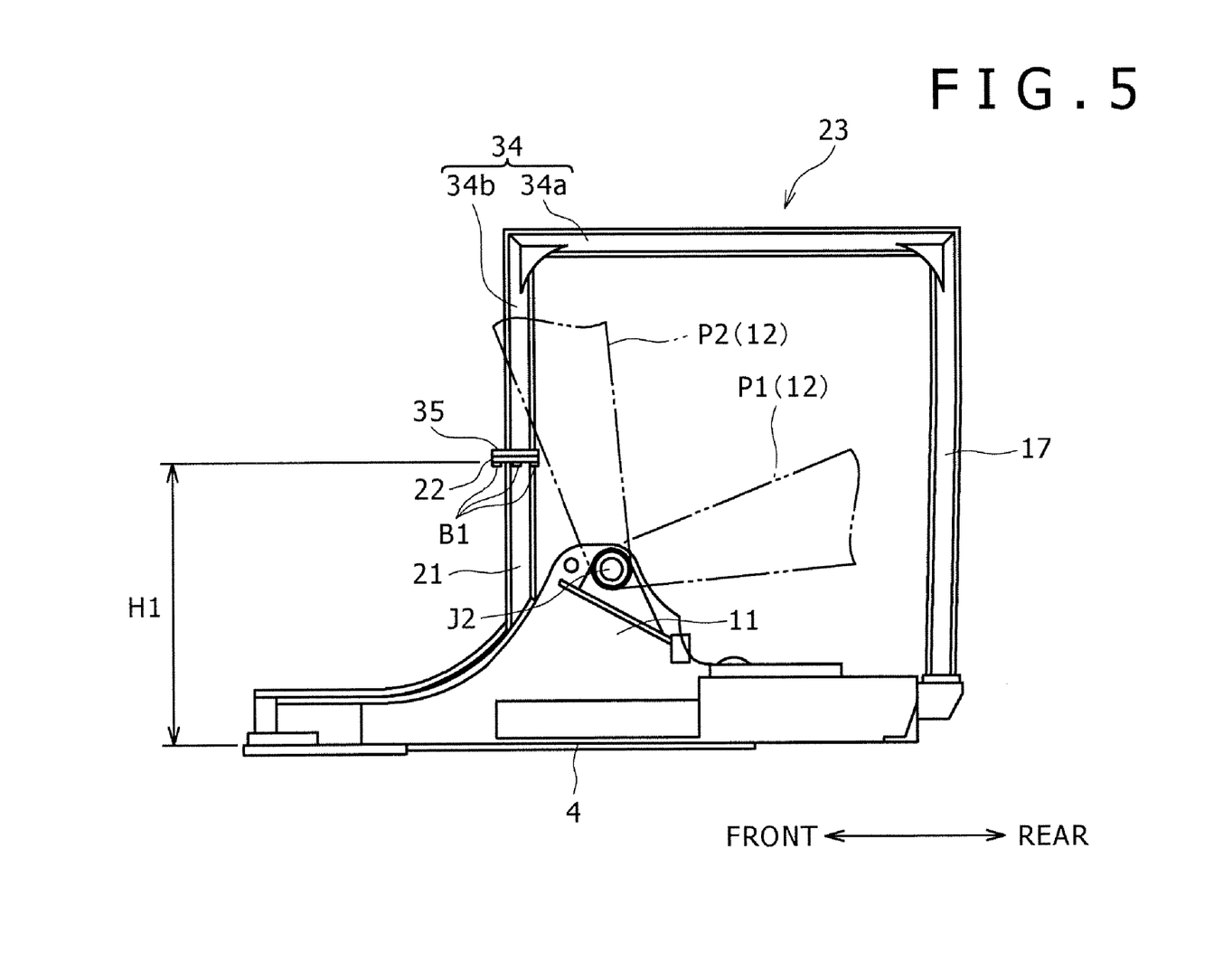
FIG. 5 is a partially simplified right side view showing the rotating frame of the upper rotating body shown in FIG. 1.

The rear supports 19 to 21 are provided vertically on the rotating frame 4 and extend upward through the outer covering 8. Specifically, the height H1 of the rear supports 19 to 21 is set, as shown in FIG. 5, so that the lateral frame 22 and the rear supports 19 to 21 are not in contact with the attachment 5 in the raised posture P2.

Referring again to FIGS. 1 to 4, the left two rear supports 19 and 20 among the rear supports 19 to 21 are arranged in rear of the respective rear corner portions 6c and 6d of the cabin 6.

Meanwhile, the rear support 21 is arranged behind the hoisting axis J2 between the vertical plates 10 and 11. Since the right rear support 21 is thus arranged within the attachment area E1, it is possible to ensure sufficient strength of the protection member 7 with the rear support 21, even in such a case as in the present embodiment where the driving devices 9 including an engine 9a, a heat exchanger 9b, and an air cleaner 9c limit the space in rear of the cabin 6.

Specifically, in the present embodiment, since the heat exchanger 9b limits the space in rear of the rear corner portion 6d of the cabin 6, the cross-sectional area of the rear support 20 is reduced correspondingly to the open space of the heat exchanger 9b. It is however possible to maintain the strength of the protection member 7 by providing the rear support 21 with a cross-sectional area greater than that of the rear support 20 vertically within the attachment area E1.

That is, since a space for allowing raising and lowering movements of the attachment 5 is ensured within the attachment area E1, the rear support 21 with an increased cross-sectional area can be provided vertically within the attachment area E1.

Also, the lower end portions of the rear supports 19 to 21 are fixed, respectively, to fixing plates 19a, 20a, and 21a, and the fixing plates 19a to 21a are attached detachably to the rotating frame 4 using bolts not shown in the figures.

Figure 6:
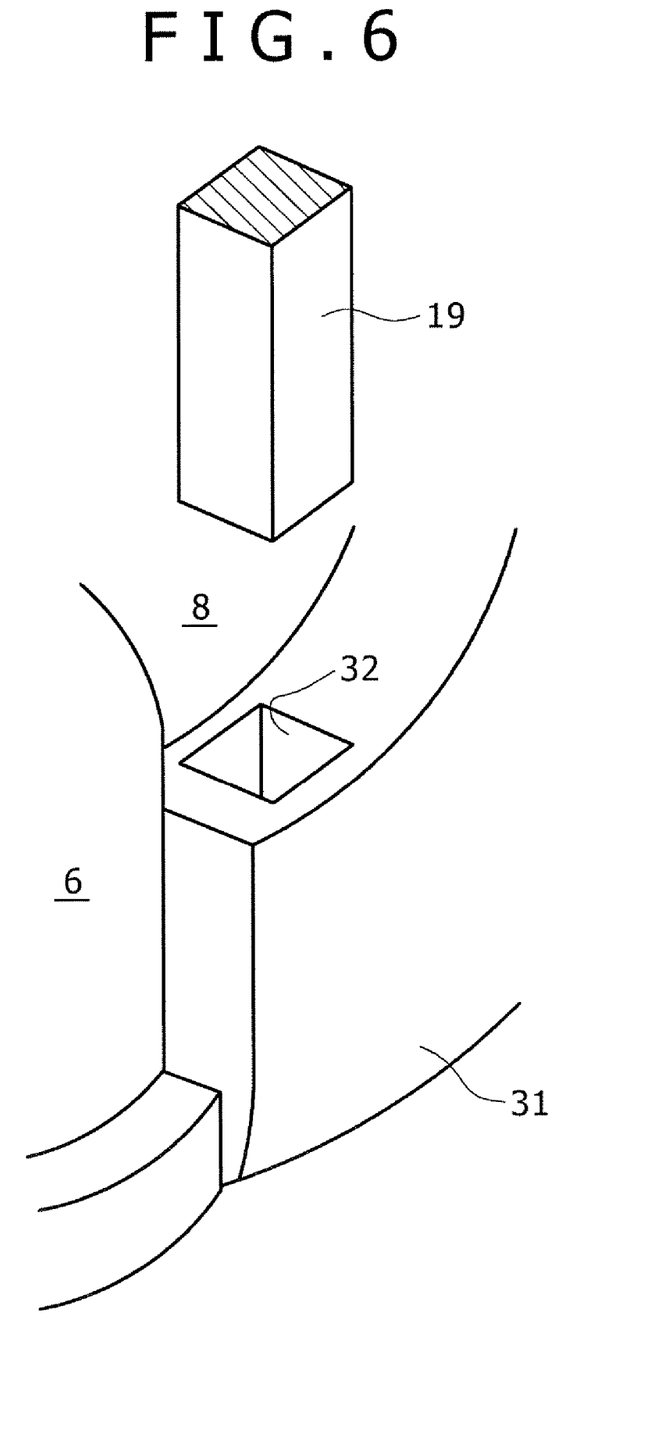
FIG. 6 is a perspective view showing another structure for fixing a rear support.

It is noted that as shown in FIG. 6, depending on the type of the hydraulic excavator 1, there may be provided a counterweight 31 outside the outer covering 8 and behind the cabin 6. In this case, the rear support 19 may be fixed to the counterweight 31. That is, a bottomed fitting hole 32 opened upward may be provided in the counterweight 31 that is made solid through casting, etc., and the rear support 19 may be inserted downward into the fitting hole 32 to be fixed to the rotating frame 4. In this case, the rear support 19 can be fixed to the rotating frame 4 without requiring extra fixing members.

Referring again to FIGS. 1 to 4, the lateral frame 22 is a plate member fixed to the upper end faces of the rear supports 19 to 21 by welding, etc. That is, since the lateral frame 22 is arranged outside (above) the outer covering 8, the upper frame 23 to be described hereinafter can be attached and detached outside the outer covering 8.

Also, the width (anteroposterior size) of the lateral frame 22 is set so as not to be in contact with the attachment 5 in the raised posture P2 (refer to FIG. 5).

The upper frame 23 includes: a pair of left and right anteroposterior frames 33 and 34 connected to the upper end portions of the front supports 17 and 18; a fixing plate 35 provided between the anteroposterior frames 33 and 34 and the lateral frame 22; and a connecting frame 36 for connecting the anteroposterior frames 33 and 34 in the lateral direction.

The anteroposterior frames 33 and 34 are arranged in such a manner as to cover the cabin 6 from above at a position shifted leftward from the area E2 where the attachment 5 is raised and lowered. Therefore, the anteroposterior frames 33 and 34 can protect the upper part of the cabin 6 while avoiding interference with raising and lowering movements of the attachment 5.

Specifically, the respective anteroposterior frames 33 and 34 include: cover parts 33a and 34a extending rearward above the cabin 6 from the respective front supports 17 and 18; and flexion parts 33b and 34b extending downward from the respective cover parts 33a and 34a to be fixed onto the common fixing plate 35.

The fixing plate 35 is connected to the lower end faces of the flexion parts 33b and 34b by welding, etc. and is fastened detachably to the lateral frame 22 using a plurality of bolts B1.

Also, the width (anteroposterior size) of the fixing plate 35 is set so as not to be in contact with the attachment 5 in the raised posture P2 (refer to FIG. 5), as is the case with the lateral frame 22. In the present embodiment, the fixing plate 35 and the lateral frame 22 have approximately the same planar shape.

The connecting frame 36 connects the anteroposterior frames 33 and 34 at appropriate points. Specifically, the connecting frame 36 includes: a first connecting bar 37 for connecting the cover parts 33a and 34a at the front end portions thereof; a second connecting bar 38 for connecting the cover parts 33a and 34a at the rear end portions thereof; and a third connecting bar 39 for connecting the cover parts 33a and 34a between the connecting bars 37 and 38.

As described heretofore, in accordance with the hydraulic excavator 1, the rear supports 19 to 21 can be provided vertically so as to support the upper frame 23 with sufficient strength by making effective use of a space between the left and right vertical plates 10 and 11 in the attachment area E1 for attaching the attachment 5 therein. In addition, since the upper frame 23 is provided at a position shifted leftward from the area E2 where the attachment 5 is raised and lowered and is connected to the lateral frame 22 for connecting the upper end portions of the rear supports 19 to 21, the rear supports 19 to 21 having advantages in strength can be provided vertically while avoiding interference between the attachment 5 and the protection member 7.

That is, since a space for allowing raising and lowering movements of the attachment 5 is ensured within the attachment area E1, the protection member 7 can have sufficient strength by providing the rear support 21 with an increased cross-sectional area vertically in the space within the attachment area E1, even in the case where there is only a limited space in rear of the cabin 6.

Then, in the hydraulic excavator 1, since there are disposed three rear supports 19 to 21 provided in rear of the cabin 6 and in the attachment area E1, it is possible to maintain the strength of the protection member 7 while reducing the cross-sectional area of each rear support smaller than the case where two rear supports are used to install the protection member 7.

Therefore, in accordance with the hydraulic excavator 1, since it is possible to fix the rear supports 19 and 20 in the limited space in rear of the cabin 6 by reducing the cross-sectional area of the rear support 19 or 20 to be provided in rear of the cabin 6, and further since it is possible to maintain the strength of the entire protection member 7 with these rear supports 19 and 20 and the rear support 21 to be provided in the attachment area E1, it is possible to ensure great strength even in the case where there is only a limited space in rear of the cabin 6.

Also, in the hydraulic excavator 1, the height H1 of the rear supports 19 to 21 is set so that the rear supports 19 to 21 and the lateral frame 22 are not in contact with the attachment 5 in the raised posture P2. It is thus possible to prevent interference between raising and lowering movements of the attachment 5 and the lateral frame 22 reliably.

Further, in the hydraulic excavator 1, the upper frame 23 and the lateral frame 22 as well as the front supports 17 and 18 and the rotating frame 4 are attachable and detachable to/from each other. Thus, when the upper frame 23 is detached from the lateral frame 22, the front supports 17 and 18 and the upper frame 23 can be detached easily from the rotating frame 4 with the rear supports 19 to 21 being fixed to the rotating frame 4.

Here, the upper frame 23 and the lateral frame 22 are attachable and detachable to/from each other outside the outer covering 8. Thus, the detaching of the protection member 7 can be carried out consistently outside the outer covering 8 by detaching the upper frame 23 and the front supports 17 and 18 from the rotating frame 4.

Figure 7A:
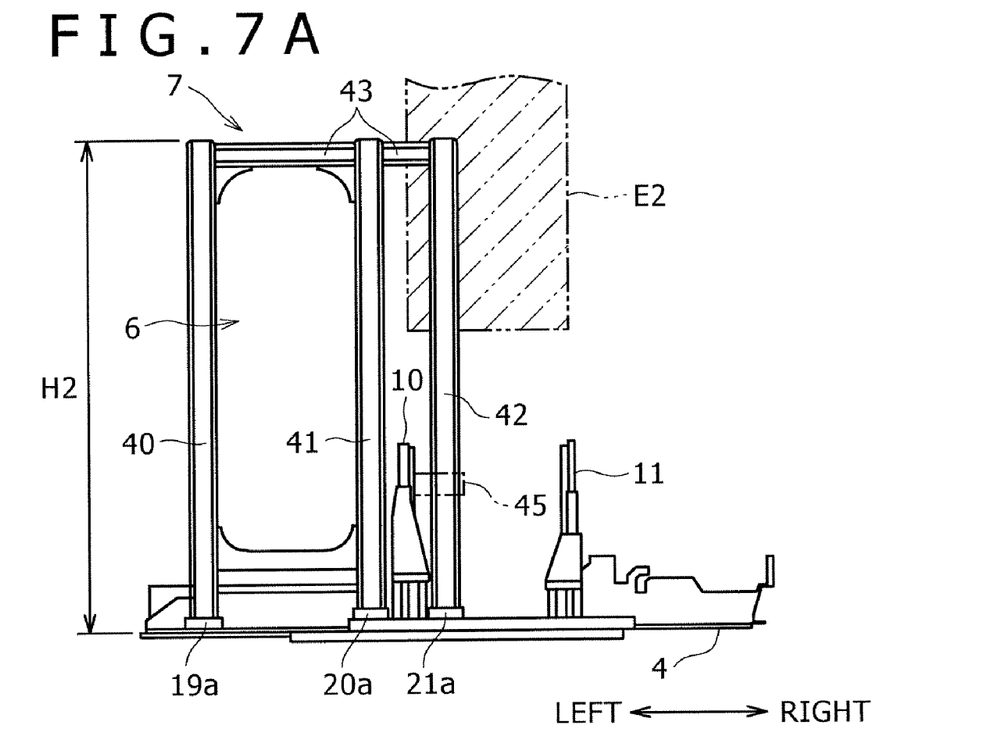
Figure 7B:
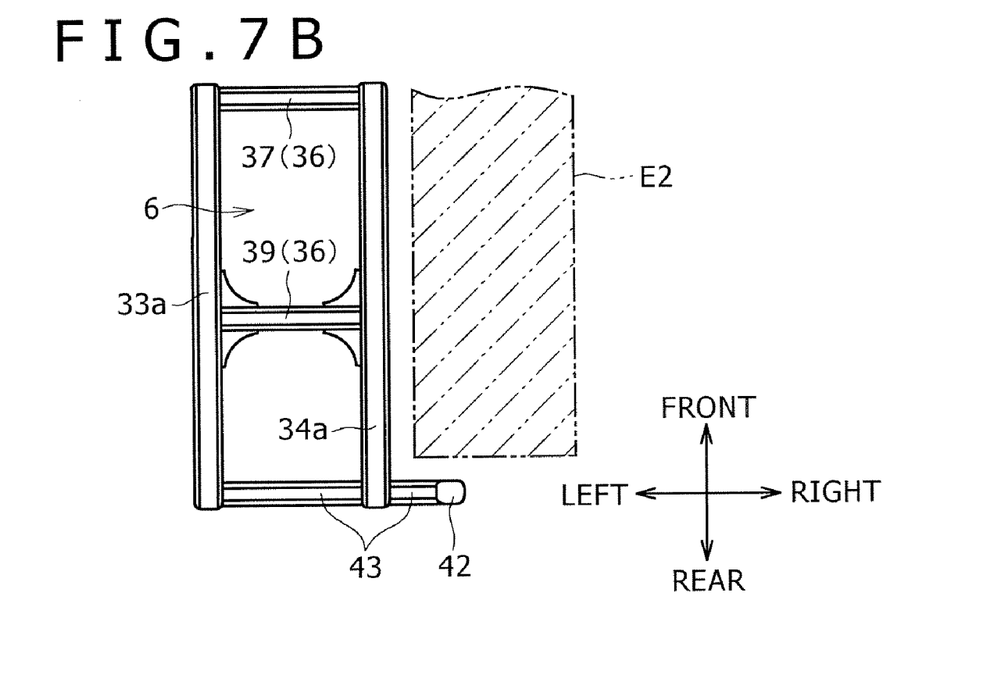

It is noted that although the first embodiment describes the arrangement in which the height H1 of the rear supports 19 to 21 is set smaller than that of the cabin 6, the height H2 of rear supports may be set greater than that of the cabin 6 as in the second embodiment shown in FIGS. 7A and 7B.

In the second embodiment, the lateral frame 43 for connecting the upper end portions of the rear supports 40 to 42 is connected directly to the cover parts 33a and 34a. That is, it is possible to omit the flexion parts 33b and 34b, fixing plate 35, and second connecting bar 38 in the above-described embodiment.

Also in this second embodiment, as shown in FIG. 7B, the cover parts 33a and 34a are arranged at positions shifted leftward from the area E2 where the attachment 5 is raised and lowered. It is thus possible to prevent interference between the cover parts 33a and 34a and the attachment 5.

However, in the present embodiment, since the lateral frame 43 is arranged higher than in the above-described embodiment, it is necessary to limit the raised posture P2 of the attachment 5 slightly forward to avoid interference with the attachment 5.

As shown in FIG. 7A, it is also possible to improve the strength of the rear support 42 by connecting the rear support 42 and the vertical plate 10 using connecting means 45. As the connecting means 45, there can be cited, for example, providing a bracket between the rear support 42 and the vertical plate 10 or connecting the rear support 42 and the vertical plate 10 by welding. It is noted that the connecting means 45 can also be applied to the rear support 21 in the first embodiment.

Figure 8A:
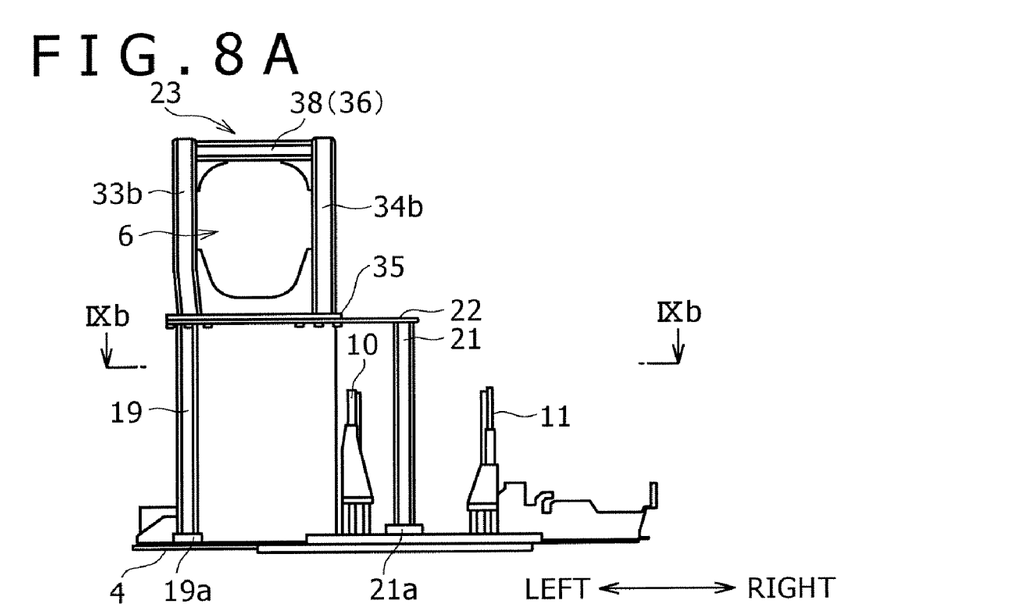
Figure 8B:
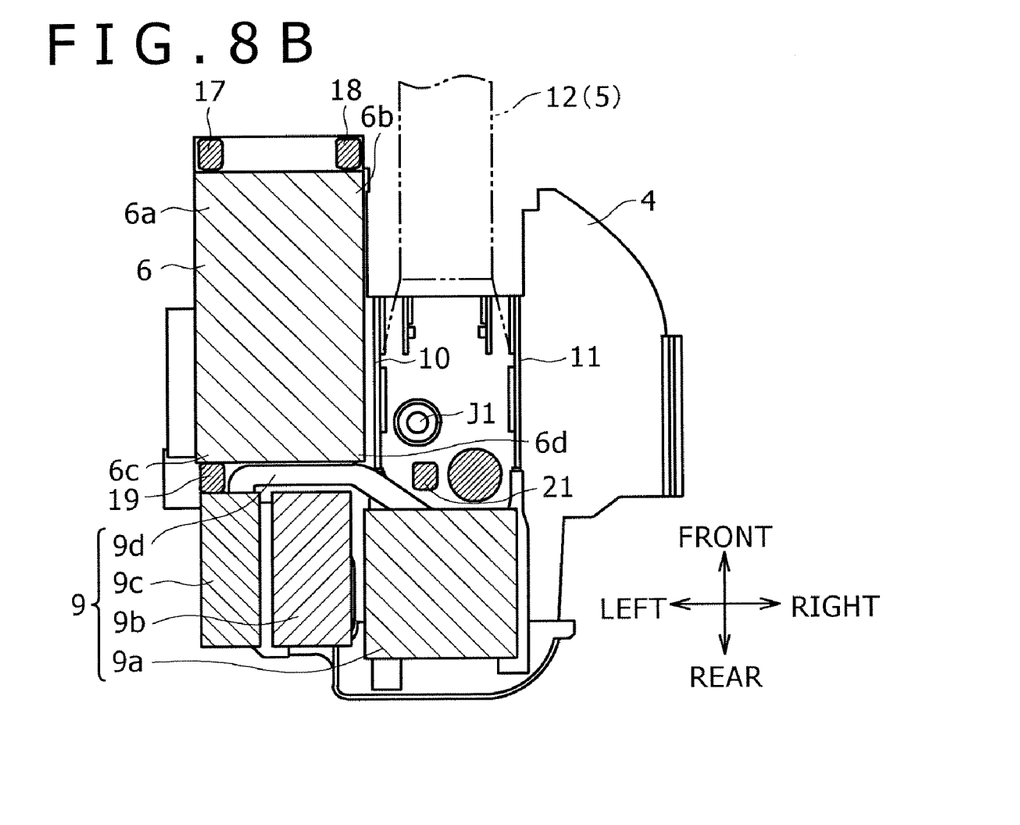

Further, although the above-described embodiments describe the arrangement in which three rear supports are disposed, it may be arranged that two rear supports be provided as in the third embodiment shown in FIGS. 8A and 8B.

The third embodiment is arranged in such a manner that the rear support 20 in the first embodiment is omitted.

That is, in this third embodiment, since the space in rear of the cabin 6 is limited by a piping 9d connecting the air cleaner 9c and the engine 9a as shown in FIG. 8B, no rear support can be provided in rear of the rear corner portion 6d of the cabin 6. However, the rear support 21 is provided vertically within the attachment area E1, which makes it possible to ensure sufficient strength of the protection member 7.

Although the invention has been described with reference to the preferred embodiments in the attached figures, it is noted that equivalents may be employed and substitutions made herein without departing from the scope of the invention as recited in the claims.

I claim:

1. A structure for installing a protection member comprising:
    a placing frame with a cabin of a working machine mounted thereon, said protection member being provided on said placing frame and surrounding said cabin from front and back as well as from above to protect said cabin;
    an attachment of said working machine adapted to be attached to said placing frame, on said placing frame being set an attachment area for attaching said attachment therein laterally with respect to said cabin; and
    a pair of left and right vertical plates to be provided in said attachment area and adapted to hold the both end portions of a lateral axis for supporting said attachment hoistably, said pair of vertical plates being provided vertically in an extended manner in the anteroposterior direction,
    wherein said protection member comprises:
    front supports provided vertically in front of said cabin on said placing frame;
    a plurality of rear supports provided vertically and laterally with respect to each other behind said cabin on said placing frame;
    a lateral frame for connecting the upper end portions of said rear supports; and
    an upper frame provided above said cabin to connect said lateral frame and said front supports at a position shifted laterally from the area where said attachment is raised and lowered, wherein said rear supports include one arranged behind said lateral axis between said vertical plates and one arranged in rear of said cabin, said lateral frame being arranged laterally across said vertical plates.

2. The structure for installing the protection member according to claim 1, wherein a plurality of said rear supports are arranged in rear of said cabin.

3. The structure for installing the protection member according to claim 1, wherein the height of said rear supports is set so that said lateral frame is arranged lower than the upper surface of said cabin, and wherein said upper frame comprises a cover part extending rearward above said cabin and a flexion part extending downward from the rear end portion of said cover part to be fixed onto said lateral frame.

4. The structure for installing the protection member according to claim 3, wherein said attachment can be attached to said placing frame hoistably between a lowered posture where said attachment is lowered forward and a raised posture where said attachment is raised rearward about said lateral axis, and wherein the height of said rear supports is set so that said rear supports and said lateral frame are not in contact with said attachment in said raised posture.

5. The structure for installing the protection member according to claim 1, wherein said upper frame and said lateral frame as well as said front supports and said placing frame are attachable and detachable to/from each other.

6. The structure for installing the protection member according to claim 5, wherein said rear supports penetrate vertically through an outer covering for covering said placing frame, said upper frame and said lateral frame being attachable and detachable to/from each other outside said outer covering.

7. The structure for installing the protection member according to claim 1, wherein a counterweight is secured behind said cabin on said placing frame and a bottomed fitting hole opened upward is formed in said counterweight, and wherein said each rear support to be provided in rear of said cabin is inserted into said fitting hole to be fixed onto said placing frame.

* * * * *